United States Patent
Koike et al.

(10) Patent No.: US 8,378,635 B2
(45) Date of Patent: Feb. 19, 2013

(54) SEMICONDUCTOR DEVICE AND RECHARGEABLE POWER SUPPLY UNIT

(75) Inventors: Toshiyuki Koike, Chiba (JP); Atsushi Sakurai, Chiba (JP); Kazuaki Sano, Chiba (JP)

(73) Assignee: Seiko Instruments Inc. (JP)

( * ) Notice: Subject to any disclaimer, the term of this patent is extended or adjusted under 35 U.S.C. 154(b) by 1071 days.

(21) Appl. No.: 12/004,998

(22) Filed: Dec. 20, 2007

(65) Prior Publication Data
US 2008/0157719 A1 Jul. 3, 2008

(30) Foreign Application Priority Data
Dec. 21, 2006 (JP) ................ 2006-344414

(51) Int. Cl.
*H02J 7/00* (2006.01)
(52) U.S. Cl. .............. 320/134; 320/136; 320/137
(58) Field of Classification Search ............ 20/134; 320/134
See application file for complete search history.

(56) References Cited

U.S. PATENT DOCUMENTS

| 6,025,697 A * | 2/2000 | Long et al. ............ 320/125 |
| 2001/0026147 A1 * | 10/2001 | Nakashimo ............ 320/134 |
| 2002/0089308 A1 * | 7/2002 | Sakurai ............ 320/134 |

* cited by examiner

*Primary Examiner* — Edward Tso
*Assistant Examiner* — Johali Torres Ruiz
(74) *Attorney, Agent, or Firm* — Adams & Wilks

(57) ABSTRACT

Provided are a semiconductor device and a rechargeable power supply unit which are capable of accurately detecting an overcharge state of a battery even in a case where the battery is charged with a sine wave charger. In a case where a ½ cycle of a charging voltage of the sine wave charger is shorter than a delay time for cancellation of an overdischarge state, when it is detected that a voltage of the battery in the overdischarge state exceeds an overdischarge detection voltage and becomes equal to or higher than an overcharge detection voltage, a delay circuit sets the delay time for cancellation of the overdischarge state to 0 seconds.

2 Claims, 2 Drawing Sheets

SEMICONDUCTOR DEVICE AND RECHARGEABLE POWER SUPPLY UNIT

BACKGROUND OF THE INVENTION

1. Field of the Invention

The present invention relates to a semiconductor device for controlling a battery to be charged with a sine curve charger, and to a rechargeable power supply unit to be charged with a sine curve charger.

2. Description of the Related Art

In recent years, portable electronic devices have been widely used. The electronic devices operate using a battery. In a case where the battery does not operate normally, a user cannot use the electronic device at a destination or an unexpected accident may occur in some cases. Accordingly, charge and discharge of the battery is monitored (for example, see JP 2001-178011 A).

During the charge of the battery, when a voltage of the battery becomes equal to or higher than an overcharge detection voltage which is used in a case of detecting an overcharge state, after the elapse of an overcharge determination time necessary for determining the overcharge state, the overcharge state of the battery is determined and the charge of the battery is inhibited.

During the discharge of the battery, when the voltage of the battery becomes lower than an overdischarge detection voltage which is used in a case of detecting an overdischarge state, after the elapse of an overdischarge determination time necessary for determining the overdischarge state, the overdischarge state of the battery is determined and the discharge of the battery is inhibited. After that, operation of part of circuits provided in are chargeable power supply unit is stopped, which results in lowering power consumption of the rechargeable power supply unit. Such a state is referred to as a power-down state. The rechargeable power supply unit has a VM terminal for monitoring whether or not the state of the rechargeable power supply unit is to be shifted to the power-down state. When a voltage at the VM terminal becomes equal to or higher than a power-down voltage, the state of the rechargeable power supply unit shifts to the power-down state. When the voltage at the VM terminal becomes lower than the power-down voltage, the power-down state of the rechargeable power supply unit is cancelled.

Further, when a charger is connected to the battery in the power-down state, the power-down state is cancelled, to thereby start the charge of the battery. When the voltage of the battery becomes equal to or higher than the overdischarge detection voltage, after the elapse of a delay time for cancellation of the overdischarge state, which is necessary for determining the cancellation of the overdischarge state, a normal state of the battery is determined. When the battery is further charged, the voltage of the battery becomes equal to or higher than the overcharge detection voltage. Then, after the elapse of the overcharge determination time, the overcharge state of the battery is determined.

In this case, it is assumed that the charger for charging the battery is a sine wave charger and the delay time for cancellation of the overdischarge state is longer than a ½ cycle of a charging voltage of the sine wave charger. At this time, in a case where the state of the rechargeable power supply unit has been shifted to the power-down state and the battery is charged with the sine wave charger, even when the voltage of the battery exceeds the overdischarge detection voltage, a time period during which the voltage of the battery exceeds the overdischarge detection voltage is shorter than the delay time for cancellation of the overdischarge state. As a result, the delay time for cancellation of the overdischarge state never elapses. Accordingly, the overdischarge state of the battery is not cancelled, and the overcharge state is not detected even in a case where the charge cannot be stopped. Note that, in this case, shift and cancellation of the power-down state are repeated as shown in FIG. 3.

SUMMARY OF THE INVENTION

In view of the above-mentioned problems, the present invention has been made, and therefore, it is an object of the present invention to provide a rechargeable power supply unit and a semiconductor device which are capable of accurately detecting an overcharge state of a battery even in a case where the battery is charged with a sine wave charger.

In order to solve the above-mentioned problems, according to the present invention, there is provided a semiconductor device, which controls charge and discharge of a battery to be charged with a sine wave charger, including: an overcharge detection circuit for detecting an overcharge state of the battery; an overdischarge detection circuit for detecting an overdischarge state of the battery; and a delay circuit for inputting a detection signal of one of the overcharge detection circuit and the overdischarge detection circuit to count a delay time, in which the delay circuit sets the delay time for cancellation of the overdischarge state to 0 seconds in a case where a ½ cycle of a charging voltage of the sine wave charger is shorter than the delay time for cancellation of the overdischarge state.

Further, according to the present invention, there is provided a rechargeable power supply unit, including: an external terminal connected to one of a sine wave charger and a load; a battery; an overcharge detection circuit for detecting an overcharge state of the battery; an overdischarge detection circuit for detecting an overdischarge state of the battery; a delay circuit for inputting a detection signal of one of the overcharge detection circuit and the overdischarge detection circuit to count a delay time; and a charge and discharge control switching element provided between the battery and the external terminal, in which the delay circuit sets the delay time for cancellation of the overdischarge state to 0 seconds in a case where a ½ cycle of a charging voltage of the sine wave charger is shorter than the delay time for cancellation of the overdischarge state.

In the present invention, in a case where the ½ cycle of the charging voltage of the sine wave charger is shorter than the delay time for cancellation of the overdischarge state, when it is detected that the voltage of the battery exceeds the overdischarge detection voltage in the overdischarge state and becomes equal to or higher than the overcharge detection voltage, the delay circuit sets the delay time for cancellation of the overdischarge state to 0 seconds. Accordingly, the cancellation of the overdischarge state is instantaneously determined, and the inhibition of the discharge is cancelled by a second switching element. As a result, even when the battery is charged with the sin wave charger, or noise such as a sine wave is superimposed on the charging voltage, the overdischarge state of the battery is cancelled. Therefore, when the battery is in the overcharge state, the overcharge state of the battery can be accurately detected.

DETAILED DESCRIPTION OF THE PREFERRED EMBODIMENTS

Hereinafter, an embodiment of the present invention will be described with reference to the attached drawings.

Figure 1:
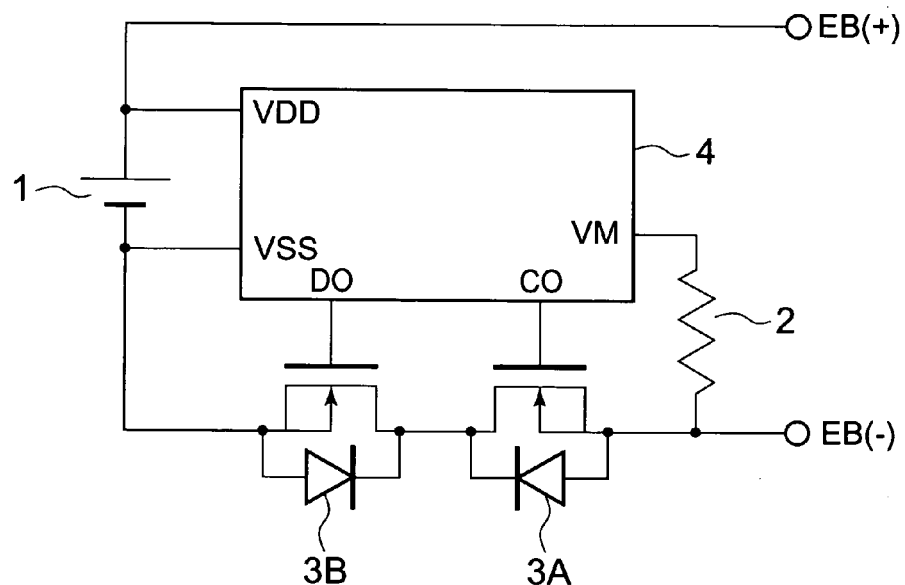
FIG. 1 is a circuit block diagram of a rechargeable power supply unit according to an embodiment of the present invention.

First, description is given of a rechargeable power supply unit according to the embodiment of the present invention. FIG. 1 is a circuit block diagram of the rechargeable power supply unit.

The rechargeable power supply unit has an EB (+) terminal and an EB (−) terminal. In addition, the rechargeable power supply unit includes a battery 1, a resistor 2, a FET 3A, a FET 3B, and a battery control circuit 4.

The battery 1 such as a lithium-ion battery is charged with a sine wave charger (not shown) connected to the EB (+) terminal and the EB (−) terminal, or the battery 1 drives a load (not shown) connected to the EB (+) terminal and the EB (−) terminal. The battery control circuit 4 controls turning on/off of each of the FET 3A having a parasitic diode and the FET 3B having a parasitic diode based on voltages at a VDD terminal and at a VSS terminal, thereby controlling charge and discharge of the battery 1. The FET 3A connected to a CO terminal is turned off to thereby limit the charge of the battery 1. The FET 3B connected to a DO terminal is turned off to thereby limit the discharge of the battery 1. Further, the battery control circuit 4 monitors a voltage generated in the resistor 2 at the VM terminal and controls the turning on/off of the FET 3B based on the voltage, thereby controlling the discharge of the battery 1.

In this case, when the battery 1 is in a normal state, the FET 3A and the FET 3B are turned on so as to be able to charge and discharge the battery 1. Further, when the battery 1 is in an overcharge state, a voltage of the battery 1 is equal to or higher than an overcharge detection voltage which is used in a case of detecting the overcharge state, and the FET 3A is turned off, thereby inhibiting the charge of the battery 1. Further, when the battery is in an overdischarge state, the voltage of the battery 1 is lower than an overdischarge detection voltage which is used in a case of detecting the overdischarge state, and the FET 3B is turned off, thereby inhibiting the discharge of the battery 1.

Figure 2:
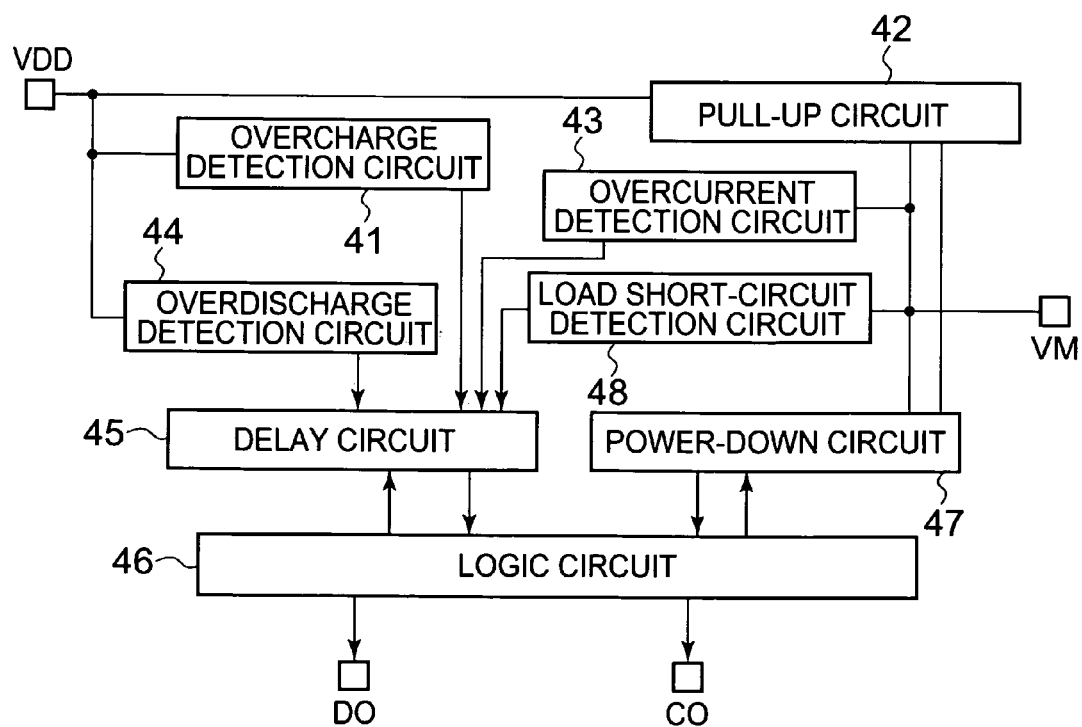
FIG. 2 is a circuit block diagram of a battery control circuit provided in the rechargeable power supply unit.
Figure 3:
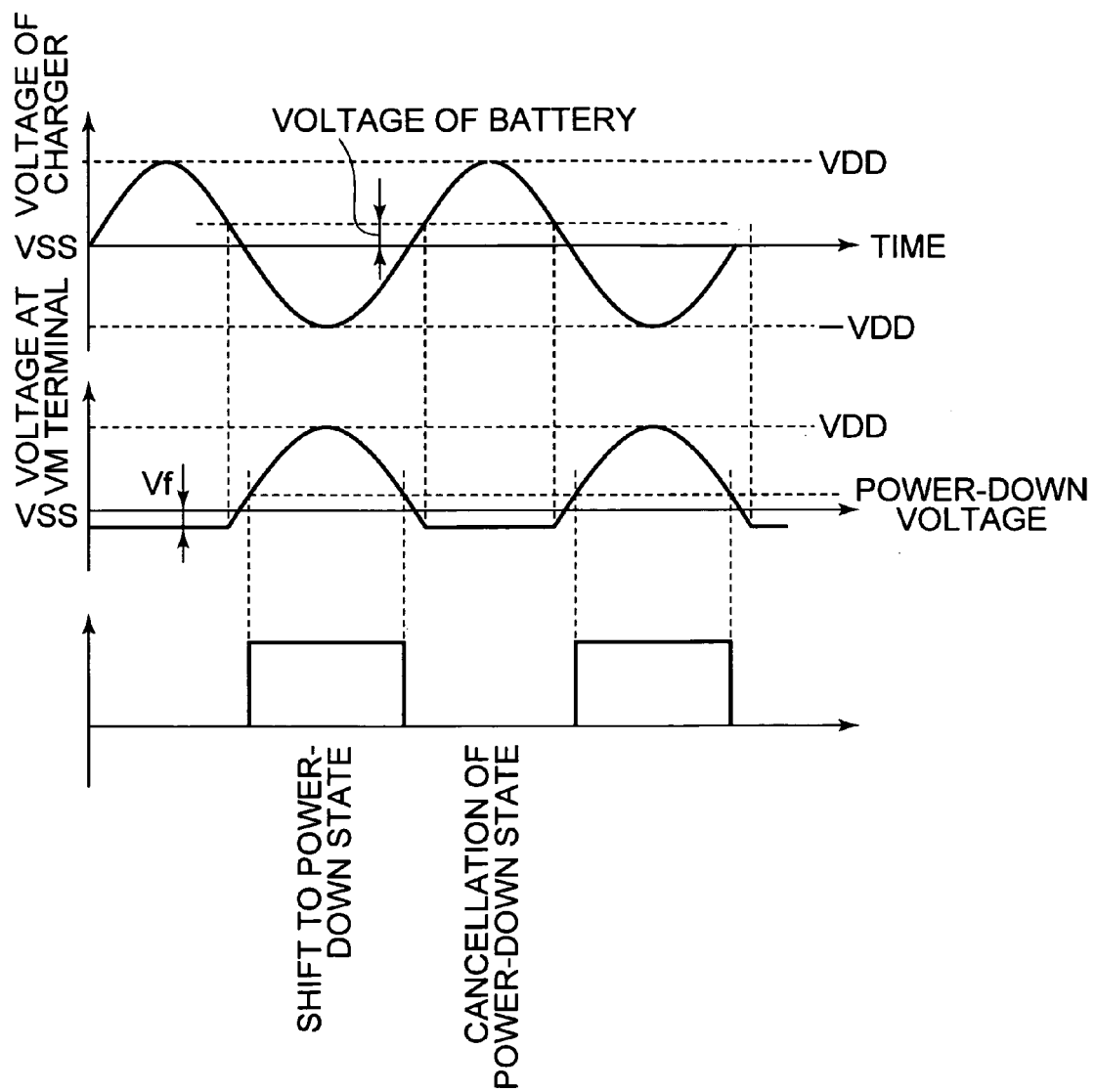
FIG. 3 is a diagram showing shift and cancellation of a power-down state according to a related art.

Next, description is given of the battery control circuit 4 provided in the rechargeable power supply unit. FIG. 2 is a circuit block diagram of the battery control circuit 4.

The battery control circuit 4 has the VDD terminal, the VSS terminal (not shown), the VM terminal, the DO terminal, and the CO terminal. In addition, the battery control circuit 4 includes an overcharge detection circuit 41, a pull-up circuit 42, an overcurrent detection circuit 43, an overdischarge detection circuit 44, a delay circuit 45, a logic circuit 46, a power-down circuit 47, and a load short-circuit detection circuit 48.

After the overcharge detection circuit 41 detects that the voltage of the battery 1 (voltage at VDD terminal) is equal to or higher than the overcharge detection voltage, the delay circuit 45 counts to determine whether an overcharge determination time (for example, 1 second), which is necessary for determination of an overcharge state, has passed or not. After the elapse of the overcharge determination time, that is, when a time period, during which the voltage of the battery 1 is equal to or higher than the overcharge detection voltage, is longer than the overcharge determination time generated in the delay circuit 45, the overcharge state of the battery 1 is determined. Then, the logic circuit 46 controls the turning on/off of the FET 3A connected to the CO terminal. At this time, the FET 3A is turned off and causes a discharge current to flow through the parasitic diode, thereby inhibiting the charge of the battery 1.

After the overdischarge detection circuit 44 detects that the voltage of the battery 1 becomes lower than the overdischarge detection voltage, the delay circuit 45 counts to determine whether an overdischarge detection time, which is necessary for determination of the overdischarge state, has passed or not. After the elapse of the overdischarge determination time, that is, when a time period, during which the voltage of the battery 1 is lower than the overdischarge detection voltage, is longer than the overdischarge determination time generated in the delay circuit 45, the overdischarge state of the battery 1 is determined. Then, the logic-circuit 46 controls the turning on/off of the FET 3B connected to the DO terminal. In this case, the FET 3B is turned off and causes a charging current to flow through the parasitic diode, thereby inhibiting the discharge of the battery 1. After that, operation of part of the circuits provided in the rechargeable power supply unit is stopped, which results in lowering power consumption of the rechargeable power supply unit. Such a state is referred to as a power-downstate. The rechargeable power supply unit has the VM terminal for monitoring whether or not the state of the rechargeable power supply unit is to be shifted to the power-downstate. The VM terminal is pulled up by the pull-up circuit 42. When the power-down circuit 47 detects that the voltage at the VM terminal becomes equal to or higher than a power-down voltage (for example, voltage lower by 1.0 V than maximum voltage of battery 1) which is obtained in the power-down state of the rechargeable power supply unit, the state of the rechargeable power supply unit shifts to the power-down state. In addition, when the power-down circuit 47 detects that the voltage at the VM terminal becomes lower than the power-down voltage, the power-down state of the rechargeable power supply unit is cancelled.

Further, when the overdischarge detection circuit 44 detects that the voltage of the battery 1 becomes equal to or higher than the overdischarge detection voltage in a case where the charger is connected to the battery 1 in the overdischarge state to thereby start the charge thereof, the delay circuit 45 counts to determine whether a delay time for cancellation of the overdischarge state, which is necessary for determination of the cancellation of the overdischarge state, has passed or not. After the elapse of the delay time for cancellation of the overdischarge state, that is, when a time period during which the voltage of the battery 1 becomes equal to or higher than the overdischarge detection voltage, is longer than the delay time for cancellation of the overdischarge state, which is generated in the delay circuit 45, the cancellation of the overdischarge state of the battery 1 is determined. Then, the logic circuit 46 controls the turning on/off of the FET-3B. At this time, the FET 3B is turned on, thereby cancelling the inhibition of the discharge (allowing discharge) of the battery 1.

In this case, it is assumed that a ½ cycle of the charging voltage of the sine wave charger is shorter than the delay time for cancellation of the overdischarge state. At this time, after the overcharge detection circuit 41 and the overdischarge detection circuit 44 detect that the voltage of the battery 1 exceeds the overdischarge detection voltage and becomes equal to or higher than the overcharge detection voltage in a case where the charger is connected to the battery 1 in the overdischarge state to thereby start the charge of the battery 1, the delay circuit 45 does not count to determine whether the delay time for cancellation of the overdischarge state has passed or not. In other words, the delay circuit 45 sets the delay time for cancellation of the overdischarge state to 0 seconds, thereby instantaneously cancelling the overdischarge state of the battery 1. After that, the delay circuit 45 counts to determine whether the overcharge determination time, which is necessary for determination of the overcharge state, has passed or not. After the elapse of the overcharge determination time, the overcharge state of the battery 1 is determined. Then, the logic circuit 46 controls the turning on/off of the FET 3A. At this time, the FET 3A is turned off, thereby inhibiting the charge of the battery 1.

When the voltage of the battery 1 exceeds the overdischarge detection voltage and becomes equal to or higher than the overcharge detection voltage, the overdischarge state of the battery 1 is instantaneously cancelled. However, even in a case where the voltage of the battery 1 becomes equal to or higher than a predetermine voltage between the overdischarge detection voltage and the overcharge detection voltage, the overdischarge state of the battery 1 may be instantaneously cancelled. In this case, for example, the overcharge detection circuit 41, which typically includes a single comparator circuit, is further provided with another comparator circuit so that a threshold with respect to an output signal of the overcharge detection circuit 41 is adjusted by those comparator circuits.

After the overcurrent detection circuit 43 detects that the discharge current of the battery 1 becomes equal to or higher than an overcurrent detection current, which is used in a case of detecting an overcurrent state, resulting from a flow of an abnormal load current or the like, the delay circuit 45 counts to determine whether an overcurrent determination time, which is necessary for determination of the overcurrent state, has passed or not. After the elapse of the overcurrent determination time, the overcurrent state of the battery 1 is determined. Then, the logic circuit 46 controls the turning on/off of the FET 3B. At this time, the FET 3B is turned off, thereby inhibiting the discharge of the battery 1.

After the load short-circuit detection circuit 48 detects that the discharge current of the battery 1 becomes equal to or higher than a load short-circuit detection current which is used in a case of detecting a load short-circuit state, resulting from short-circuiting of the load or the like, the delay circuit 45 counts to determine whether a load short-circuit determination time, which is necessary for determination of the load short-circuit state, has passed or not. After the elapse of the load short-circuit determination time, the load short-circuit state of the battery 1 is determined. Then the logic circuit 46 controls the turning on/off of the FET 3B. At this time, the FET 3B is turned off, thereby inhibiting the discharge of the battery 1. Note that a value of the load short-circuit detection current is larger than a value of the overcurrent detection current.

Note that the FETs 3A and 3B are both field-effect transistors (FETs). Alternatively, other switching elements or other transistors may be used as the FETs 3A and 3B.

Further, when the overcharge determination time becomes longer, erroneous detection of the overcharge state due to noise is reduced. However, such an adverse effect as overcharge of the battery 1 is increased. When the overcharge determination time becomes shorter, the adverse effect of the overcharge of the battery 1 is reduced, but the erroneous detection of the overcharge state due to noise is increased. Accordingly, it is necessary to set the overcharge determination time so that the erroneous detection of the overcharge state due to noise can be reduced and the adverse effect of the overcharge of the battery 1 can be reduced. It is also necessary to set in a similar manner the delay time for cancellation of the overdischarge state, the overdischarge determination time, the overcurrent determination time, and the load short-circuit determination time.

Further, the battery control circuit 4 is provided as a single semiconductor device.

What is claimed is:

1. A semiconductor device, which controls charge and discharge of a battery to be charged with a sine wave charger, comprising:
   an overcharge detection circuit for detecting an overcharge state of the battery;
   an overdischarge detection circuit for detecting an overdischarge state of the battery; and
   a delay circuit that receives a detection signal of the overcharge detection circuit or the overdischarge detection circuit for counting a delay time,
   wherein the delay circuit sets the delay time for cancellation of the overdischarge state to 0 seconds when the overcharge detection circuit and the overdischarge detection circuit detect that the voltage of the battery exceeds an overdischarge detection voltage and becomes equal to or higher than an overcharge detection voltage in a case where a ½ cycle of a charging voltage of the sine wave charger is shorter than the delay time for cancellation of the overdischarge state.

2. A rechargeable power supply unit, comprising:
   an external terminal connected to a sine wave charger;
   a battery;
   an overcharge detection circuit for detecting an overcharge state of the battery;
   an overdischarge detection circuit for detecting an overdischarge state of the battery;
   a delay circuit that receives a detection signal of the overcharge detection circuit or the overdischarge detection circuit for counting a delay time; and
   a charge and discharge control switching element provided between the battery and the external terminal,
   wherein the delay circuit sets the delay time for cancellation of the overdischarge state to 0 seconds when the overcharge detection circuit and the overdischarge detection circuit detect that the voltage of the battery exceeds an overdischarge detection voltage and becomes equal to or higher than an overcharge detection voltage in a case where a ½ cycle of a charging voltage of the sine wave charger is shorter than the delay time for cancellation of the overdischarge state.

\* \* \* \* \*